United States Patent [19]

Toyokuni et al.

[11] 4,026,124
[45] May 31, 1977

[54] CASE FOR AXLE HAVING UNIVERSAL JOINT

[75] Inventors: Kazuo Toyokuni; Shunzo Yamada; Teizo Takahashi; Hajime Nakamura, all of Sakai; Kazunari Nobutomo; Shinji Kawakami, both of Souja, all of Japan

[73] Assignee: Kuboto Tekko Kabushiki Kaisha, Osaka, Japan

[22] Filed: Apr. 8, 1975

[21] Appl. No.: 566,120

[30] Foreign Application Priority Data

July 22, 1974 Japan .................... 49-87595[U]
Sept. 25, 1974 Japan .................... 49-116297[U]

[52] U.S. Cl. .................... 64/32 R; 64/6; 403/57
[51] Int. Cl. .................... F16d 3/84
[58] Field of Search .................... 64/32 R, 32 F, 6, 4, 64/1 R; 403/57, 74

[56] References Cited

UNITED STATES PATENTS

| | | | |
|---|---|---|---|
| 1,808,798 | 6/1931 | Urschel | 64/32 |
| 2,617,278 | 11/1952 | Sindelar | 64/32 |
| 2,781,211 | 2/1957 | Holmes | 403/57 |
| 2,944,442 | 7/1960 | Muegerl et al. | 64/32 |
| 3,075,370 | 1/1963 | Kings | 64/32 |
| 3,462,975 | 8/1969 | Skromme et al. | 64/32 |

*Primary Examiner*—Samuel Scott
*Assistant Examiner*—Randall Heald
*Attorney, Agent, or Firm*—Edwin E. Greigg

[57] ABSTRACT

Axle case comprising a tube, a substantially semispherical first member integral with the tube and a substantially semispherical second member connected to the first member and rotatable relative thereto.

3 Claims, 11 Drawing Figures

CASE FOR AXLE HAVING UNIVERSAL JOINT

BACKGROUND OF THE INVENTION

The present invention relates to cases for axles having a universal joint such as axles for transmitting power to steering and propelling wheels as employed in various tractors for agriculture and civil engineering.

Cases for axles having a universal joint must be flexible at the joint portion. Usual axle cases therefore comprise two semispherical members having different diameters and a tube integral with one of the semispherical members. Both the members cover the universal joint and are connected together rotatably relative to each other in the direction of flexion of the universal joint, with the tube housing the axle connected to the universal joint.

Because the semispherical members must be rotatable relative to each other, the tube invariably has a smaller diameter than the semispherical member connected thereto, this resulting in the drawback that the junction between the tube and the semispherical member has low strength. Especially in the case of tractors for use in agriculture and civil engineering, the axle case is by nature subject to a heavy load, which causes a stress concentration in the junction and possibly leads to deformation and break.

Such a drawback may be remedied with the use of a strong tube of larger diameter which is integral with a semispherical member having a correspondingly enlarged diameter. However, the enlarged structure materially increases both the size and weight of the axle case itself, and the case becomes difficult to make and handle, renders the tractor body heavier and involves various other objections.

As will be apparent from the above description, it is desired that axle cases of this type be made compact and lightweight to the greatest possible extent and have a tough junction between the tube and the semispherical member, whereas none of the conventional axle cases are satisfactory in these respects.

SUMMARY OF THE INVENTION

The present invention, accomplished in view of the foregoing problems, provides an axle case which, although relatively compact and lightweight, is tough and resistant to deformation and break even when subjected to a heavy load at the junction between the tube and semispherical member.

The case of this invention for an axle having a universal joint comprises a tube covering the axle over the entire periphery thereof in its circumferential direction, a substantially semispherical first member integral with the tube and having larger diameter than the tube, the interior of the tube communicating with the interior space of the first member through an opening formed in the semispherical wall of the first member, a substantially semispherical second member connected to the first member and rotatable relative thereto in the direction of flexion of the universal joint, both the members surrounding the universal joint, and a reinforcing member provided for the junction between the tube and the first member.

The reinforcing member fixed to the junction between the tube and the first member sufficiently strengthens the junction, rendering the junction resistant to deformation and break even when a heavy load concentrically acts on that portion. Accordingly, it becomes possible to make the case itself compact and lightweight and, at the same time, to reinforce the junction.

An object of this invention is to provide a durable axle case comprising a tube and a first member, the junction of which is resistant to deformation and break even when subjected to stress concentration owing to a heavy load.

Another object of the invention is to provide an axle case which is compact and lightweight and is therefore inexpensive although including a tough junction.

Another object of this invention is to provide an axle case which is made of sheet metal and which is thereby rendered still lighter and easier to manufacture.

Another object of the invention is to provide a reinforcement which is usable for a conventional axle case to strengthen the above-mentioned junction simply by slightly modifying the axle case.

Other objects and benefits of this invention will become apparent from the following description.

DESCRIPTION OF THE PREFERRED EMBODIMENTS

Figure 1:
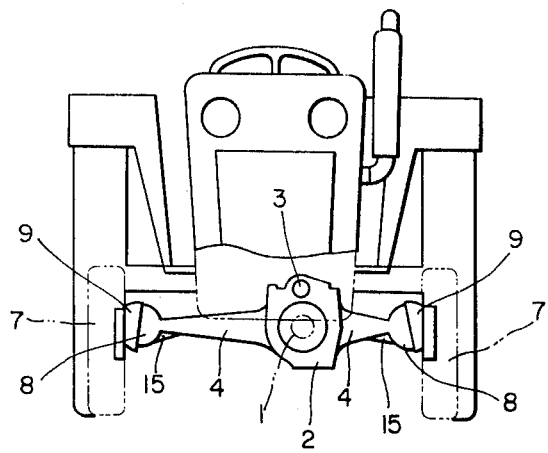
FIG. 1 is a front view showing a tractor in its entirety.

The axle case of this invention will be described below with reference to the preferred embodiments. FIG. 1 shows a farm tractor which is adapted to be propelled by four wheels. A drive shaft 1 is operatively connected to an unillustrated prime mover. A casing 2 housing a differential gear assembly is pivotably attached to the tractor frame by a pivot 3 extending longitudinally of the frame. Tubes 4 extend from the opposite sides of the casing 2 respectively, and an axle 6 having a universal joint 5 is positioned within each of the tubes 4. The axles 6 are operatively connected to the drive shaft 1 through the differential gear assembly in the casing 2. The axles 6 serve to transmit power to front wheels 7 which are steering and propelling wheels. However, the axle for which the case of this invention is usable is not necessarily limited to such axle but may be any axle insofar as it has a universal joint.

The end of each tube 4 is formed with a substantially semispherical first member 8 integral therewith. The interior space of the first member 8 and the interior of the tube 4 are in communication with each other through an opening formed in the semispherical wall of the first member 8. A substantially semispherical second member 9 has a slightly larger diameter than the first member 8 and is positioned outside the first member 8. The members 8 and 9 are operatively connected to each other by approximately vertical support pins 10 so as to be rotatable relative to each other in the direction of flexion of the universal joint 5. The universal joint 5 is disposed in the space formed inside both the members 8 and 9. A coupling shaft 11, connected at its one end to the universal joint 5, is rotatably supported by the second member 9 and has the other end adapted to transmit power to the front wheel 7 through suitable power transmitting means.

Because the second member 9 is rotatable about the support pins 10 relative to the first member 8 which is integral with the end of the tube 4 as already described, the tube 4 invariably has a smaller diameter than the first member 8 at the junction therebetween. The junction is therefore constricted and has a very low strength. According to this invention, this portion is reinforced by the following means.

The casing 2 and the axle cases, which axle cases each comprise the tube 4 and the first member 8, are integrally molded by casting. When forming the casting, a suitable number of boss portions 12 are molded integrally. Each of the boss portions 12 is formed with a threaded bore 13, so that a reinforcing member 15 can be fixed in position by bolts 14 screwed into the threaded bores 13. The reinforcing member 15 is made of sheet metal and has the shape shown in FIG. 3. It is fittable over the tube 4 and the first member 8 from outside in intimate contact therewith. Accordingly, as long as the reinforcing member 15 is fixed in position, the junction is sufficiently reinforced and is made resistant to deformation and break under a heavy load. Furthermore, the reinforcing member 15, which is adapted to be fixed to the tube 4 and the first member 8 in contact with the outer surfaces thereof, is readily usable for usual axle cases. The reinforcing member 15 need not always be fixed by the bolts 14 but can be fixed in place as by welding when so desired. Although the reinforcing member 15 is attached to the underside of the axle case according to the embodiment described, it may be attached to the upper side or lateral side thereof.

Figure 2:
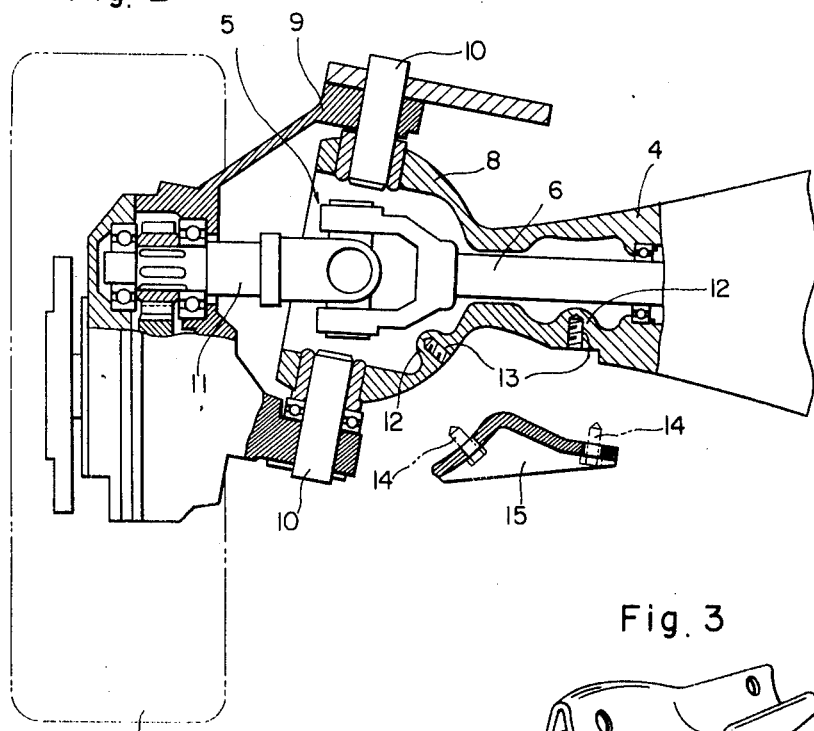
FIG. 2 is a front view partly broken away to show the principal parts of an axle case as incorporated in the tractor of FIG. 1.
Figure 3:
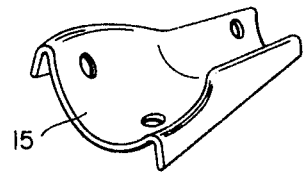
FIG. 3 is a perspective view of a reinforcing member to be fixed to the axle case shown in FIGS. 1 and 2.

Other embodiments will be described below with reference to FIGS. 4 to 8 and FIGS. 9 and 11 wherein the parts having the same function as those already described with reference to FIGS. 1 to 3 are referred to by like numerals, and the description of these parts is not given therefore.

Figure 4:
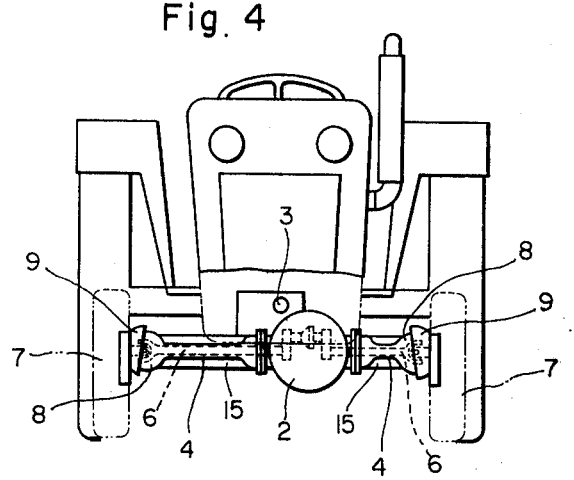
FIG. 4 is a front view showing a tractor in its entirety incorporating another embodiment.
Figure 5:
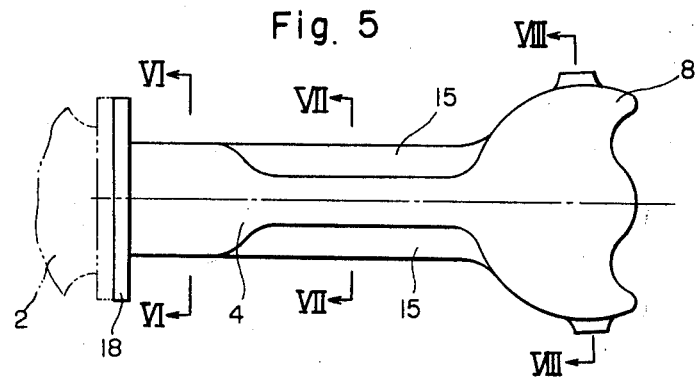
FIG. 5 is a front view showing the axle case mounted on the tractor shown in FIG. 4.
Figure 6:
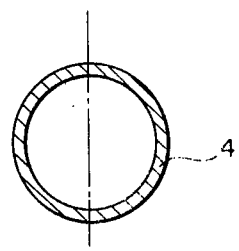
FIGS. 6 to 8 are cross sectional views taken along the lines VI, VII and VIII in FIG. 5 respectively and showing the axle case.
Figure 7:
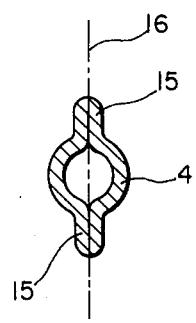
Figure 8:
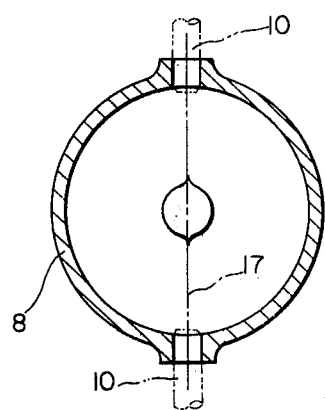

The axle case shown in FIGS. 4 and 5, namely tube 4 and first member 8 are integrally formed from a metal pipe by deformation working. Likewise reinforcing members 18 are also integrally formed by deformation. More specifically, one end of a metal pipe is deformed into the first member 8, and the intermediate portion between the first member 8 and the tube 4 is also deformed to provide the reinforcing members 15. The reinforcing members 15 are formed on the upper and lower sides of the axle case respectively. The line 16 interconnecting the reinforcing members 15, namely the center line thereof, is substantially parallel to the axis 17 of support pins 10 interconnecting the first and second members 8 and 9. Although the line 16 and the axis 17 need not necessarily be substantially parallel to each other, the parallel arrangement of both 16 and 17 has the advantage of permitting the second member 9 to be rotatable at a large angle relative to the first member 8. The embodiment of FIG. 4 includes a casing 2 which is also made of sheet metal and which is connected to the tube 4 by a flange 18.

Because the tube 4, first member 8 and reinforcing members 15 of the embodiment shown in FIGS. 4 to 8 are integrally made of sheet metal and the casing 2 is also made of sheet metal, the entire assembly is very easy and inexpensive to make and is lightweight. Furthermore, the tube 4 and first member 8, formed from a metal pipe, are less likely to allow oil leak from the interior of the tube 4 or the first member 8.

Figure 9:
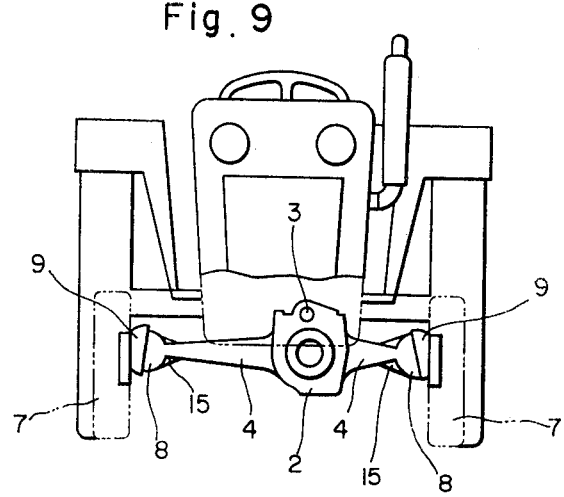
FIG. 9 is a front view showing a tractor in its entirely equipped with another embodiment.
Figure 10:
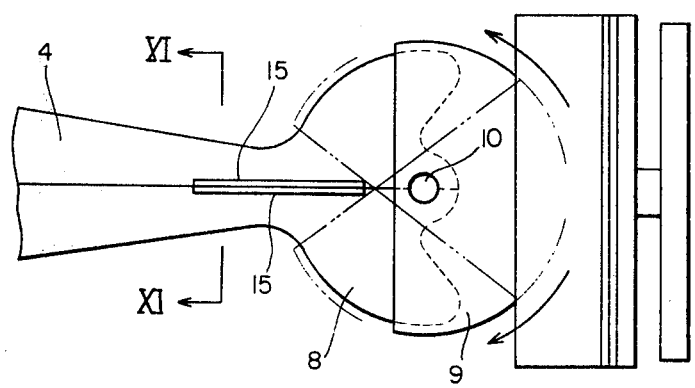
FIG. 10 is a plan view showing the axle case mounted on the tractor of FIG. 9.
Figure 11:
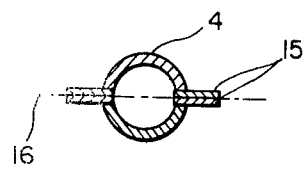
FIG. 11 is a view in cross section taken along the line XI in FIG. 10 and showing the axle case.

Like the embodiment of FIGS. 4 to 8, the axle case and casing 2 shown in FIGS. 9 to 11 are also made of sheet metal. Especially according to this embodiment, the tube 4 and first member 8 comprise a plurality of segments, namely two segments as divided along the longitudinal direction of the axle 6. Each of the segments is formed from sheet metal by press working. The edges of the segments at the intermediate portion between the tube 4 and the first member 8 are fixedly provided with flange-like reinforcing members 15, which are securely joined together in face-to-face contact with each other by the bolts and nuts or like means. Thus the reinforcing members serve to connect the segments together and also to reinforce the junction of the tube 4 and the first member 8. The line 16 interconnecting the opposing pairs of reinforcing members 15 is substantially parallel to the axis 17 of the support pins 10 as in the embodiment of FIGS. 4 to 8.

The axle case including the tube 4 and first member 8 made of sheet metal and comprising a plurality of segments is of course lightweight as a whole and is easier and less expensive to manufacture than one formed from a metal pipe. Although the tube 4 and first member 8 of the abovementioned embodiment comprise two segments, the axle case can be composed of three or four segments.

What we claim is:

1. A case for an axle having a universal joint for transmitting power to steering and propelling wheels comprising:

a tube of cast metal encompassing the entire periphery of said axle in the circumferential direction, a substantially semispherical first member having an exterior wall, a cup-shaped portion and a diameter larger than said tube formed as an integral part of said tube, said tube and said semispherical first member being conjoined by a constricted neck portion, a substantially semispherical second member of cast metal having a cup-shaped portion connected to the first member and rotatable relative thereto in the direction of flexion of the universal joint, the confronting spacedly arranged cup-shaped portions of said first and second members surrounding the universal joint, and a removable reinforcing member substantially approximating a shoehorn the enlarged area of which is complementally conformed to the exterior of said semispherical second member and the neck zone of which is complemental to said tube suitably attached to said first member and said tube.

2. A case as claimed in claim 1, wherein said shoehorn-like reinforcing member is made of a sheet metal.

3. A case as claimed in claim 2, wherein the tube and the first member are provided with inwardly extending boss portions, said boss portions being formed with threaded bores by means of which said reinforcing member may be bolted to said first member and said tube.

* * * * *